United States Patent
Wang et al.

(10) Patent No.: US 12,452,110 B2
(45) Date of Patent: Oct. 21, 2025

(54) FAST COMMON MODE CHARGING

(71) Applicant: Apple Inc., Cupertino, CA (US)

(72) Inventors: Charles L. Wang, Los Altos, CA (US); Yi-Hsiu E. Chen, San Jose, CA (US); Yu-Yau Guo, San Jose, CA (US); Wei-Ming Lee, San Jose, CA (US)

(73) Assignee: Apple Inc., Cupertino, CA (US)

( * ) Notice: Subject to any disclaimer, the term of this patent is extended or adjusted under 35 U.S.C. 154(b) by 190 days.

(21) Appl. No.: 18/339,232

(22) Filed: Jun. 21, 2023

(65) Prior Publication Data

US 2024/0430138 A1 Dec. 26, 2024

(51) Int. Cl.
*H04L 25/02* (2006.01)
*G06F 13/40* (2006.01)

(52) U.S. Cl.
CPC ...... *H04L 25/0276* (2013.01); *G06F 13/4072* (2013.01); *H04L 25/0278* (2013.01)

(58) Field of Classification Search
CPC ............. H04L 25/0276; H04L 25/0278; H04L 25/0272; G06F 13/4072
See application file for complete search history.

(56) References Cited

U.S. PATENT DOCUMENTS

| | | | |
|---|---|---|---|
| 5,485,488 A * | 1/1996 | Van Brunt | H04L 5/20 375/220 |
| 6,188,271 B1 * | 2/2001 | Wang | G06F 13/4072 327/530 |
| 6,696,852 B1 | 2/2004 | Brunolli | |
| 8,270,399 B2 | 9/2012 | Holst et al. | |
| 10,595,124 B2 | 3/2020 | McCormack et al. | |
| 2007/0071111 A1 * | 3/2007 | Muljono | H04L 25/0276 375/257 |
| 2023/0253975 A1 * | 8/2023 | Hsieh | H03M 1/0863 341/144 |

* cited by examiner

*Primary Examiner* — Daniel D Chang
(74) *Attorney, Agent, or Firm* — Kowert, Hood, Munyon, Rankin & Goetzel, P.C.; Dean M. Munyon

(57) ABSTRACT

An apparatus for performing a fast common mode recharge is disclosed. The apparatus includes a transmitter circuit configured to transmit a differential signal on a communication bus that includes a true signal line and a complement signal line and a measurement circuit configured to measure respective voltage levels of the true signal line and the complement signal line. The apparatus further includes a control circuit configured to, in response to exiting a sleep mode, select one of a plurality of operation modes using the respective voltage levels of the true signal line and the complement signal line. The transmitter circuit is further configured to adjust the respective voltage levels of the true signal line and the complement signal line based on a selected operation mode of the plurality of operation modes.

20 Claims, 8 Drawing Sheets

FAST COMMON MODE CHARGING

BACKGROUND

Technical Field

This disclosure is directed to electronic communications systems, and more particularly, to high-speed serial communications systems with a communication channel having a common mode voltage.

Description of the Related Art

High-speed serial communications typically use differential communications channels. A differential communications channel comprises two signal lines, with one signal line carrying the true value of a data symbol. One characteristic associated with a differential signal channel is a common mode voltage. This voltage may be defined as one half the sum of the vector voltages of the two signal lines relative to a ground voltage.

When circuits coupled to a differential communications channel are placed into a sleep mode, the common mode voltage is not present. Upon exit of the sleep mode, the signal lines of the differential signal channel may be charged to the common mode voltage prior to beginning operation.

SUMMARY

An apparatus for performing a fast common mode recharge is disclosed. In one embodiment, an apparatus includes a transmitter circuit configured to transmit a differential signal on a communication bus that includes a true signal line and a complement signal line and a measurement circuit configured to measure respective voltage levels of the true signal line and the complement signal line. The apparatus further includes a control circuit configured to, in response to exiting a sleep mode, select one of a plurality of operation modes using the respective voltage levels of the true signal line and the complement signal line. The transmitter circuit is further configured to adjust the respective voltage levels of the true signal line and the complement signal line based on a selected operation mode of the plurality of operation modes. The respective voltage levels may be adjusted to a common mode voltage.

In one embodiment, the transmitter circuit may adjust the respective voltage levels by transmitting one or more pulses onto the true and complement signal lines. The true and complement signal lines may be charged to the common mode voltage by these pulses. To reduce the charging time, the voltage of the transmitted pulses may exceed the common mode voltage that is the target for the charging operation. Both of the true and complement signal lines may be charged in the same direction (e.g., the voltage on both may be increased concurrent with one another). Prior to beginning the charging operation, the control circuit may cause an equalization of the voltages on the true and complement signal lines by shorting them together.

BRIEF DESCRIPTION OF THE DRAWINGS

The following detailed description makes reference to the accompanying drawings, which are now briefly described.

DETAILED DESCRIPTION OF EMBODIMENTS

Figure 1:
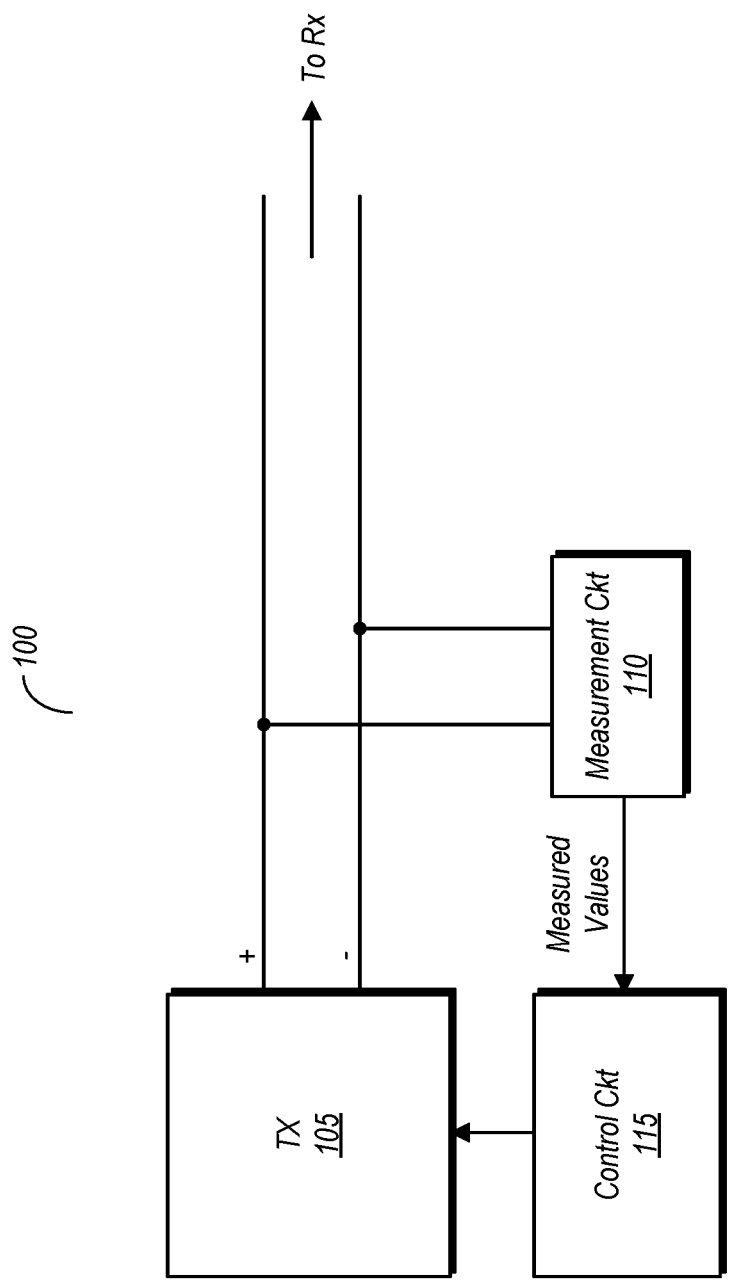
FIG. 1 is a block diagram of one embodiment of an apparatus including a transmitter circuit for transmitting information on a differential signal path.

The present disclosure is directed to an apparatus and a method for fast charging signal lines of a serial link to a common mode voltage. When a transmitter in a high-speed serial interface exits a sleep mode, the signal lines of the communications channel (e.g., a differential link) need to be charged to a common mode voltage. This can be accomplished simply by charging the signal lines to the required voltage, with the charge time being based on an RC time constant. Typically, the amount of time necessary to charge the signal lines to 90% of the required common mode voltage requires 2.3 time constants. However, this amount of charge time may be unacceptable in some systems, as the charge time represents a time that the serial link is unavailable for normal operations. The lengthy charge process can also consume a non-negligible amount of current.

The present disclosure makes use of the insight that using a voltage magnitude greater than the common mode voltage may result in faster charging of the signal lines. However, in such a scenario, there is a possibility of overshoot in which the signal lines are charged to a voltage greater than the common mode voltage (or outside some acceptable tolerance limits).

Accordingly, a circuit for faster charging of a circuit lines to a common mode voltage is disclosed herein. In one embodiment, the circuit includes a measurement circuit that, upon exit from a sleep mode, performs a measurement of the signal lines of a differential channel to determine a starting point. A control circuit including a state machine then controls the transmitter circuits to perform charging of the signal lines at a voltage that is of a greater magnitude than the common mode voltage. In particular, the control circuit may cause the transmitter circuit to transmit one or more pulses onto true and complementary signal lines of a differential signal path. The pulse (or pulses) may be transmitted at a voltage that is greater than the common mode voltage to cause faster charging. In various embodiments, the selected voltage may be based on a difference between an initial measurement of respective voltage levels on the true and complementary signal lines and the common mode voltage. The duration of the pulses may also be varied during this portion. After transmitting one or more pulses, the measurement circuit may again measure the respective voltages present on the true and complementary signal lines to determine if additional charging is needed. If the respective voltage levels on the true and complementary signal lines are within a specified range that includes the common mode voltage, the operation may be discontinued and normal operation may commence.

Prior to beginning the charging operation, the control circuit may cause an equalization of respective voltage levels on the true and complementary signal lines by shorting them together. Additionally, if a large enough voltage difference develops between the true and complementary signal lines during the charging operation, the control circuit may again cause their respective voltages to be equalized by temporarily shorting them together. In the case of overshoot (e.g., the voltage is greater than the common mode voltage by some margin), discharge circuitry may be provided to reduce the voltage on the affected signal line(s).

The various apparatus and method embodiments described herein may advantageously allow for a faster common mode charging than can be achieved with conventional mechanisms. This may reduce the delay in commencing normal operations upon exiting from a sleep mode. Furthermore, more accurate charging of the signal lines, through the use of the measurement circuit and the control circuit (including the state) machine may be achieved.

Various embodiments will now be described in further detail, beginning with a discussion of a transmitter circuit arranged for common mode charging according to the disclosure. The operation of various embodiments is then described with respect to a timing diagram and a state diagram. A communications system that may implement an embodiment of the transmitter of the present disclosure is then discussed. Flow diagrams used to describe embodiments of operational methods are then described. An example system that my implement one or more instances of the apparatus disclosed herein concludes the detailed description.

Transmitter Circuit Arranged for Fast Common Mode Charging:

FIG. 1 is a block diagram of one embodiment of an apparatus configured for charging true and complement signal lines of a communications link to a common mode voltage. In the embodiment shown, system 100 includes a transmitter circuit 105, a measurement circuit 110, and a control circuit 115. Transmitter circuit 105 in the embodiment shown is configured to, during normal communications operations, transmit components of a differential signal onto true (+) and complementary (−) signal lines of a differential signal path. Although not explicitly shown here, a receiver may be coupled to the other end of the signal path to receive the transmitted signals. Transmitter circuit 105 may be implemented using any suitable type of circuitry used for transmitters, including various buffers, amplifiers, drivers, impedance matching circuits, and so on.

In addition to being used to transmit signals carrying data during normal communications operations, transmitter circuit 105 may also be used to charge the true and complement signal lines to a common mode voltage upon, e.g., exit from a sleep state. The use of transmitter circuit 105 to charge the true and complement signal lines is in lieu of using separate charging circuitry that may be used in previous embodiments of a communications system. The charging may be carried out by transmitting common mode pulses on the true and complement signal lines, in accordance with a particular operational mode determined by control circuit 115. In transmitting the pulses during the charging operation, transmitter circuit 105 may transmit substantially the same voltage value on both the true and complement signal lines, in contrast to the transmitting of complementary values during normal communications. Accordingly, both the true and complement signal lines may charge in the same direction at substantially the same time.

During the charging, the voltages at which the pulses are transmitted may exceed the common mode voltage to cause faster charging to the common mode voltage. In charging an RC circuit, it typically takes 2.3 time constants to reach 90% of the charging voltage. Thus, charging to a common mode voltage of Vdd/2 (one half the supply voltage) would require 2.3 time constants to reach 90% of this value. However, if using a higher value to charge the signal lines, such as Vdd, the charging time can be significantly reduced. For example, using Vdd instead of Vdd/2 as the charging voltage, the true and complement signal lines may be charged to a value of Vdd/2 in a time equivalent to 0.69 time constants, which is 3.3 times faster than if Vdd/2 itself were used as the charging voltage. Even faster charging times are available if voltages greater than Vdd are available as the charging voltage.

The charging of the true and complement signal lines may be conducted under the control of the control circuit 115, in accordance with the selected operational mode. The control circuit may determine the operational voltage based on measured voltage values from the true and complement signal lines. Prior to beginning the transmission of pulses for charging the signal lines, measurement circuit 110 may measure the respective voltages on the true and complement signal lines, and report the measured values to the control circuit 115. Any suitable circuitry may be used to implement measurement circuit 110. In some embodiments, measurement circuit 110 may include analog-to-digital converter (ADC) circuitry to convert measured analog voltage values into digital values to be used by control circuit 115. The RC time constant may be programmed into control circuit 115 in one embodiment. In another embodiment, control circuit 115 may perform successive measurements and compute the RC time constant based on the change of voltage and the amount of time elapsed.

Based on the measured values (and the difference between these values and the common mode voltage), the control circuit may select an operational mode which may include selecting a pulse duration and a particular number of pulses (one or more) to transmit before a subsequent measurement is taken. In some cases, the operational mode may also include selecting a voltage of the pulses, which, as noted above, may exceed the common mode voltage to enable faster charging. Control circuit 115 may then cause transmitter circuit 105 to begin transmitting pulses of the specified duration (and voltage, in some embodiments) to cause charging of the true and complement signal lines.

After a specified number of pulses (one or more) have been transmitted on each of the true and complement signal lines, the transmitter circuit 105 may pause transmissions (under direction of control circuit 115) to enable another measurement to be carried out by measurement circuit 110. Based on the measured values, control circuit 115 may cause one of four actions to be taken: 1) additional pulses to be transmitted; 2) discontinuing of the charging process; 3) discharging the true and complement signal lines; or 4) shorting the two outputs together. Action 1) may be taken if the measured voltages of the true and complement signal lines are still less than the common mode voltage and not within a specified range thereof. Action 2) may be taken if the measured voltages of the true and complement signal lines is at the common mode voltage or within a specified range thereof. Action 3) may be taken if the measured voltages exceeds the common mode voltage and is not within the specified range. As will be discussed below, discharge circuitry may be included in various apparatus embodiments to carry out option 3). Action 4) may be taken if, for any reason, the measured voltages exceed a certain threshold, the two signal lines may be shorted together to reduce or eliminate the difference so that on subsequent cycles, one of the first three actions can be taken. As an alternate to action 4), embodiments are possible and contemplated in which the true and complement signal lines are shorted together during charging (and any discharging), thereby keeping their voltages equal throughout the common mode charging process.

Figure 2:
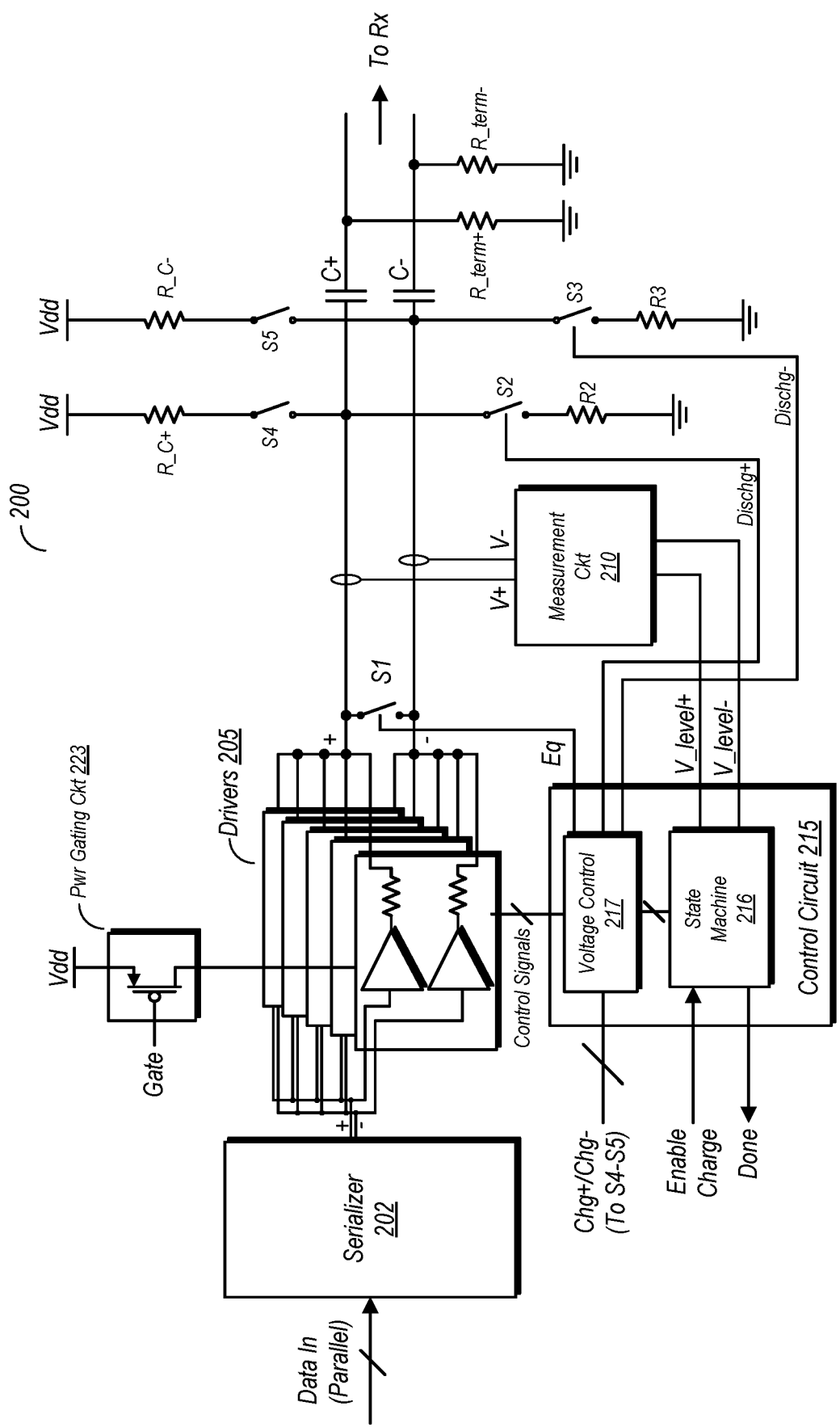
FIG. 2 is a schematic diagram of one embodiment of a circuit including a transmitter coupled to a differential signal path.

FIG. 2 is a schematic diagram of one embodiment of a portion of a communications system including circuitry for charging of true and complement signal paths to a common mode voltage. In the embodiment shown, apparatus 200 includes a serializer 202, transmitter circuitry in the form of a number of driver 205, a measurement circuit 210, and a control circuit 215. Additional circuits to carry out certain operations are also illustrated in FIG. 2, and will be discussed in more detail below.

Apparatus 200 is part of a serial communications system. Data may originally be received in parallel by serializer 202. The incoming parallel data may then be converted into a serial format and provided to drivers 205. Each of the drivers 205 includes transmitter circuitry that transmits serial data on a differential signal path that includes the true and complement signal lines. The drivers 205 may be selectively enabled or disabled to control the strength (e.g., the voltage) of transmitted signals. During normal communications operations, the drivers may transmit differential signals with complementary values on the true and complement signal lines, and with an approximate voltage differential of Vdd/2 if the receiver is terminated with matched characteristic impedances. Peak-to-peak differential voltage may be approximately Vdd. For charging operations, driver circuit 205 may be arranged to transmit signals at a reduced output impedance, and with substantially the same voltage on both the true and complement signal lines. Output impedance may be changed by changing the number of drivers 205 that are enabled in parallel, with the output impedance falling as more drivers 205 are enabled.

The driver circuits 205 in the embodiment shown are AC coupled to a receiver circuit (not shown) via the true and complement signal paths. Charging of the signal lines to the common mode voltage may thus include charging these capacitors, C+ and C−. Termination resistors R_term+ and R_term− are also coupled to the true and complement signal lines, respectively. The RC time constant which governs the charge times of the true and complement signal lines may thus be determined by the capacitors C+ and C− and resistors R_term+ and R_term−, respectively.

Driver circuits 205 in the embodiment shown may be inhibited from receiving power when in a sleep mode. In the embodiment shown, power gating circuit 223 may inhibit the supply voltage Vdd from being provided to the various instances of driver circuit 205 in response to assertion of the active low signal Gate. This signal may be generated by, e.g., a power management circuit (not shown here). When operation of the communications link is to resume, the power management circuit may de-assert the Gate signal, thereby allowing power to be provided to the driver circuits 205.

Control circuit 215 in the embodiment shown includes a state machine 216 and a voltage control circuit 217. State machine 216 in the embodiment shown may be a finite state machine that controls the charging operation in accordance with the voltage measurements V_level+ and V_level− (corresponding to the voltage levels of the true and complement signal lines, respectively) received from measurement circuit 210. State machine 216 may use logic circuitry to implement a methodology for carrying out the charging of the true and complement signal lines, which may include selecting one of a number of different operational modes. Operational modes may include a pulse width and a number of pulses to be transmitted, and may, in some embodiments, include a voltage of the pulses to be transmitted. The operational mode can in some instances include discharging of one or both of the true and complement signal lines, particularly when the voltage measured thereon exceeds the common mode voltage by at least a certain amount. State machine 216 may also cause equalization of the voltages on the true and complement signal lines, e.g., prior to beginning the charging process. Although not shown in this particular diagram, embodiments are possible and contemplated in which the true and complement signal lines are shorted together throughout the process of charging to the common mode voltage. State machine 216 may begin the charging process in response to receiving the 'Enable Charge' signal from an external source (e.g., the power management circuit not shown here that also carried out the power gating operation discussed above). Upon completion of the charging process, state machine 216 may assert the 'Done' signal, which may be received by the same functional circuitry that asserted the 'Enable Charge' signal.

Voltage control circuit 217 in the embodiment shown is configured to translate commands or other information provided by state machine 216 into control signals to cause adjustments to the voltage on the true and complement signal lines. These adjustments may include charging the signal lines, discharging the signal lines, or equalizing the voltage between the signal lines. Voltage control circuit 217 may also, in some embodiments, cause the driver circuits 205 to enter a high impedance state while measurements are being carried out by measurement circuit 210. This may prevent loading that could adversely affect the measurements.

Prior to the beginning of a charging operation, control circuit 215 may perform an equalization of the voltage present on the true and complement signal lines. In particular, voltage control circuit 217 may assert the 'Eq' signal, which causes the closing of switch S1. When S1 is closed, the true and complement circuit lines are effectively short circuited to one another, and thus their respective voltages are equalized. This allows the charging of both signal lines to start from the same voltage. It is noted that, in some embodiments, S1 may be closed whenever the driver circuits 205 are in a sleep mode. Thus, upon waking driver circuits 205, respective voltages of the true and complement signal lines may already be equalized. In some embodiments, S1 may remain closed until the common mode voltage is obtained on both the true and complement signal lines.

For conducting charging operations, voltage control circuit 217 may cause ones of the driver circuits 205 to transmit signals onto the true and complement signal lines. The number of driver circuits 205 enabled for a particular pulse transmission may vary from one embodiment to the next in accordance with control signals provided from voltage control circuit 217. Additionally, the number of pulses and width (duration) of each may also be controlled by voltage control circuit 217. This may serve as the primary mechanism for charging the true and complement signal lines from a lower voltage value up to the common mode voltage. In some embodiments, voltage control circuit 217 may also vary the voltage at which the driver circuits 205 transmit pulses. In embodiments where the voltage of the pulses is not variable, the pulses may be transmitted with a voltage substantially equal to Vdd. It is noted that, during the charging operation, voltage control circuit 217 causes the same voltage to be transmitted on both the true and complement signal lines, in contrast to signals transmitted during normal communications operations in which differential signals are transmitted.

At times during the charging operation, the respective voltages on the true and complement signal lines may exceed the common mode voltage by more than an acceptable tolerance value. In such cases, discharge circuitry is provided to allow for some discharging of the signal lines. A first discharge circuit is coupled to the true signal line, and includes switch S2 and resistor R2. Switch S2 may be closed by assertion of the 'Dischg+' signal by voltage control circuit 217. A second discharge circuit is coupled to the complement signal line, and includes switch S3 and resistor R2. Assertion of the 'Dischg−' signal closes S3. Switches S4 and S5, when close, enable pull-up paths to via resistors R_C+ and R_C−, respectively. The true and complement signal lines may be charged, discharged, or equalized by controls signals asserted by voltage control circuit 217, under the direction of state machine 216.

Figure 3:
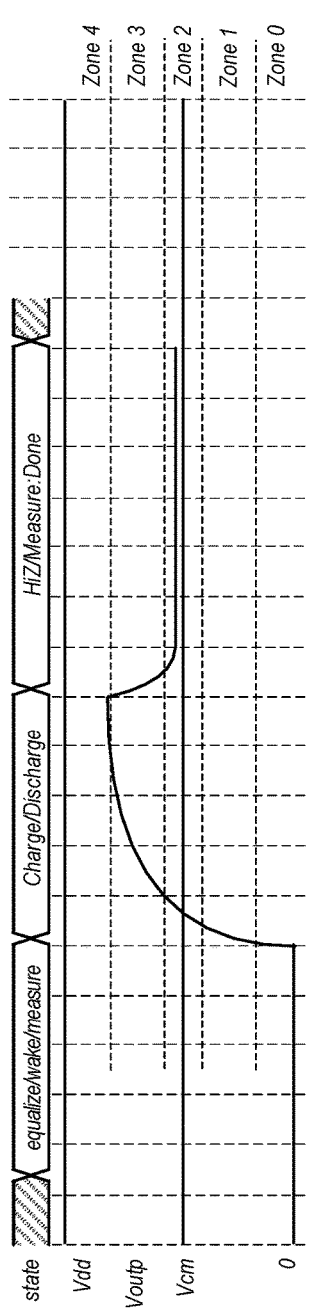
FIG. 3 is a group of timing diagrams illustrating a various instances of a common mode charging operation performed by one embodiment of a circuit according to the disclosure.
Figure 3:
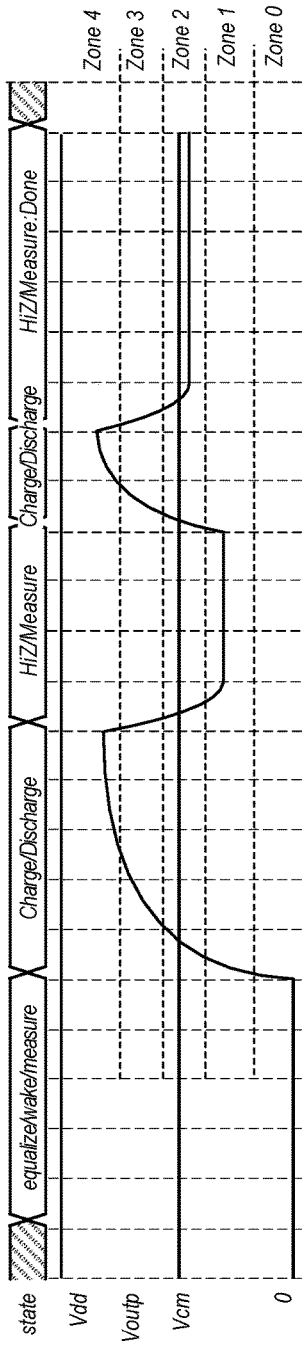
Figure 3:
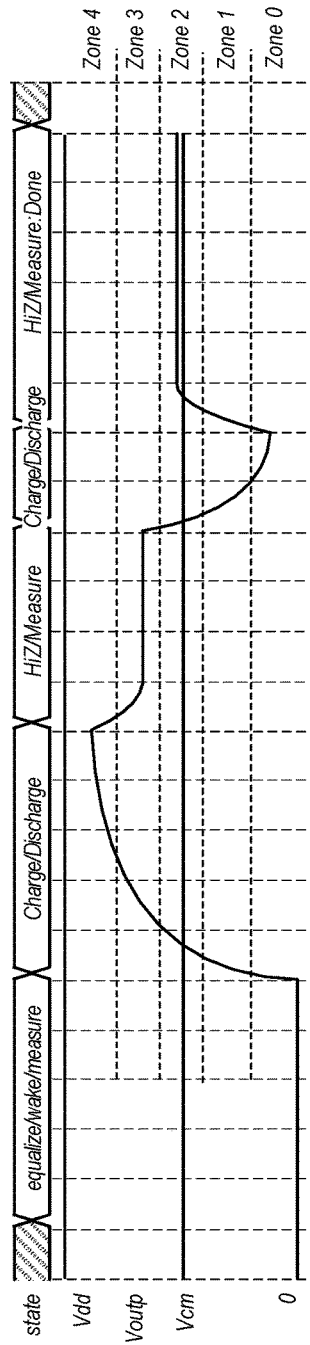
Figure 4:
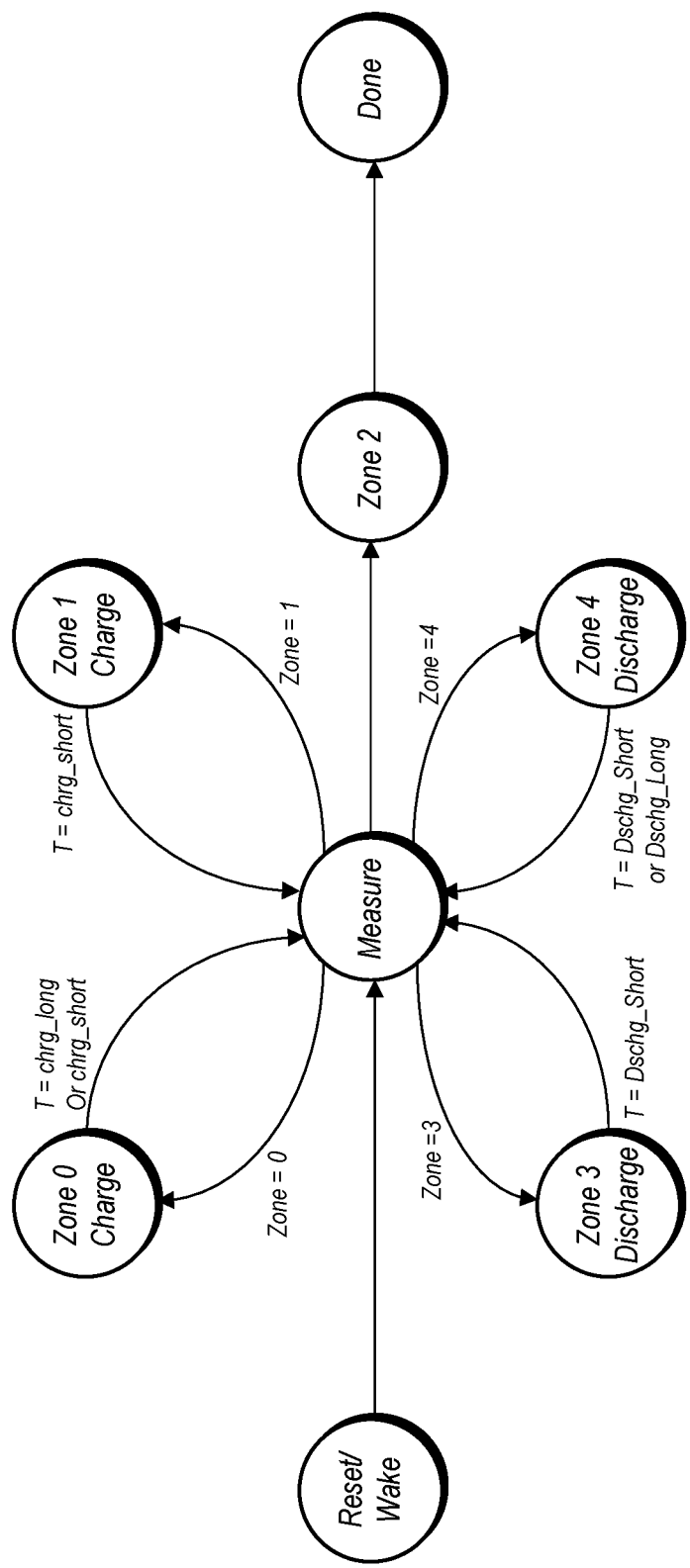
FIG. 4 is a state diagram illustrating operation of one embodiment of a state machine implemented in a control circuit.

Charging Process:

FIGS. 3 and 4 illustrate the charging process for one embodiment of the circuitry discussed above. More particularly, FIG. 3 includes timing diagrams with corresponding voltage graphs, while FIG. 4 includes a state diagram to illustrate the operation of one embodiment of a state machine in a control circuit such as that discussed above.

In FIG. 3, the charging process is illustrated graphically. The process may be conducted to charge respective voltages on the true and complement signal lines into a range labeled here as Zone 2, which includes the common mode voltage Vcm along with a range of voltages representing a tolerance value. In this example, there are five different ranges, Zone 0-Zone 4. Zones 0 and 1 are less than the common mode voltage, while Zones 3 and 4 are greater than the common mode voltage. When the respective voltages of the true and complement signal lines are in one of Zone 3 or Zone 4, the discharge circuitry discussed above may be used to discharge the signal lines until their respective voltages fall back to within Zone 2.

Prior to beginning the process, the transmitter circuitry is awakened from a sleep state, while the voltages on the true and complement signal lines are equalized and measured, as described above. The voltage present on the true and complement signal lines may be zero, some relatively low voltage, or some arbitrary voltage. Thereafter, the transmitter circuit for each signal line transmits at least one pulse to begin the charging process. FIG. 3 as shown here includes three different examples in which the voltage on a signal line is charged to the common mode voltage.

In Example 1, a pulse is transmitted during the period labeled "Charge/Discharge." The voltage of the transmitted pulse, as shown here, may eventually exceed the common mode voltage for some time. Thereafter, the transmitter enters the high impedance/measurement phase (labeled HiZ/Measure). The voltage on the signal line is allowed time to settle and a measurement is taken. In Example 1, the voltage on the signal line settles into Zone 2, indicating that it is withing specified tolerance limits with respect to the common mode voltage. Accordingly, charging in Example 1 is accomplished with only a single pulse.

In Example 2, a first pulse is transmitted during a first charge/discharge phase. After completing transmission of the first pulse, the transmitter is placed in a high impedance state and the voltage on the corresponding signal line is measured. In this example, the measured voltage after the first pulse is within Zone 1, indicating that it is below the common mode voltage and outside tolerance limits. Accordingly, a second pulse is transmitted. However, as can be seen in the drawing, the second pulse is of a lower duration than the first pulse. Generally speaking, the charging process can include varying the duration of a given pulse based on the most recently measured voltage relative to the common mode voltage. After completing transmission of the second pulse, the transmitter is again placed in a high impedance state and another measurement is performed once the voltage on the signal line has had sufficient time to settle. As shown in the illustrated example, the measured voltage is slightly less than the common mode voltage after the second pulse, but within the tolerance limits defined by Zone 2. Accordingly, the charging process is complete. Accordingly, in this example, charging is accomplished with multiple pulses of different durations.

In Example 3, a pulse is transmitted during the first Charge/Discharge period. After completing transmission of the pulse and placing the transmitter in a high impedance state, the subsequent measurement results in the voltage being in Zone 3, which is above the common mode voltage and outside of tolerance limits. Accordingly, during the next charge/discharge phase, the circuit line is discharged (this may also be considered to transmitting a negative-going pulse). The discharge period duration is less than that of the previously transmitted pulse. After completing the discharge phase, the transmitter is once again placed in the high-impedance state followed by another measurement. The measurement results in the voltage being in Zone 2, and thus charging is completed in this example with a charge followed by a discharge.

FIG. 4 is a state diagram illustrating operation of one embodiment of a state machine such as that discussed with reference to FIG. 2. It is noted that other embodiments are possible and contemplated, and the number of states may be different from what is illustrated here.

The charging process carried about by a state machine according to the state diagram of FIG. 4 begins with the reset or a wake of a transmitter circuit that is coupled to a differential communications channel having true and complement signal lines. The process then proceeds to a measure operation in which the respective voltages of true and complement signal lines are determined. The measure voltage(s) may be determined to be in a range of voltages, referred to as zones. The zones in this particular example may correspond to the zones in FIG. 3. If the measurement is in Zone 0, the signal lines are charged, which may be accomplished using long pulses (e.g., T1 of FIG. 3) or shorter pulses (T2 of FIG. 3). The number of pulses may vary depending on whether the short or long pulse are selected. If the measured voltages are in Zone 1, charging may be carried out/continues, using the short pulses since Zone 1 is closer to the common mode voltage.

If the measured voltages are in Zone 3, which includes voltages greater than those of Zone 2 (which includes the common mode voltage), a discharge operation is carried out with one or more short time intervals of discharging. These short time intervals may, in one embodiment, correspond to the intervals of the shorter pulses of duration T2.

When the measured voltages are in Zone 4, additional discharging may be carried out using short or long intervals. The number of short intervals may be increased to allow for more discharge time since Zone 4 is further from Zone 2 than Zone 3. The long intervals in one embodiment may correspond to the intervals of the long pulses of duration T1.

When the measurement indicates that the respective voltages of the true and complement signal lines are in Zone 2, the state machine may consider the charging process complete, and indicated that it is done by, e.g., asserting the 'Done' signal as shown in FIG. 2.

Numerous variations of the state diagram (and thus, corresponding state machines) are possible and contemplated. For example, even though both signal lines may begin from the same voltage and may be charged by pulses having substantially the same voltage and duration values, it is possible that a voltage disparity may develop during the charging process. Accordingly, a finite state machine may implement a process in which the voltages may be equalized again (e.g., by closing S1 per the embodiment of FIG. 2), or where the signal lines receive a different number of pulses. Furthermore, the disclosure contemplates a charging voltage that may vary from one sequence of pulses to the next, or even from one pulse to the next. Such variations may allow additional granularity in the charging of the signal lines such that they may be charged to values as close to the common mode voltage as possible. Embodiments in which both the true and complement signal lines are shorted together during the process of charging to the common mode voltage are also possible and contemplated.

Figure 5:
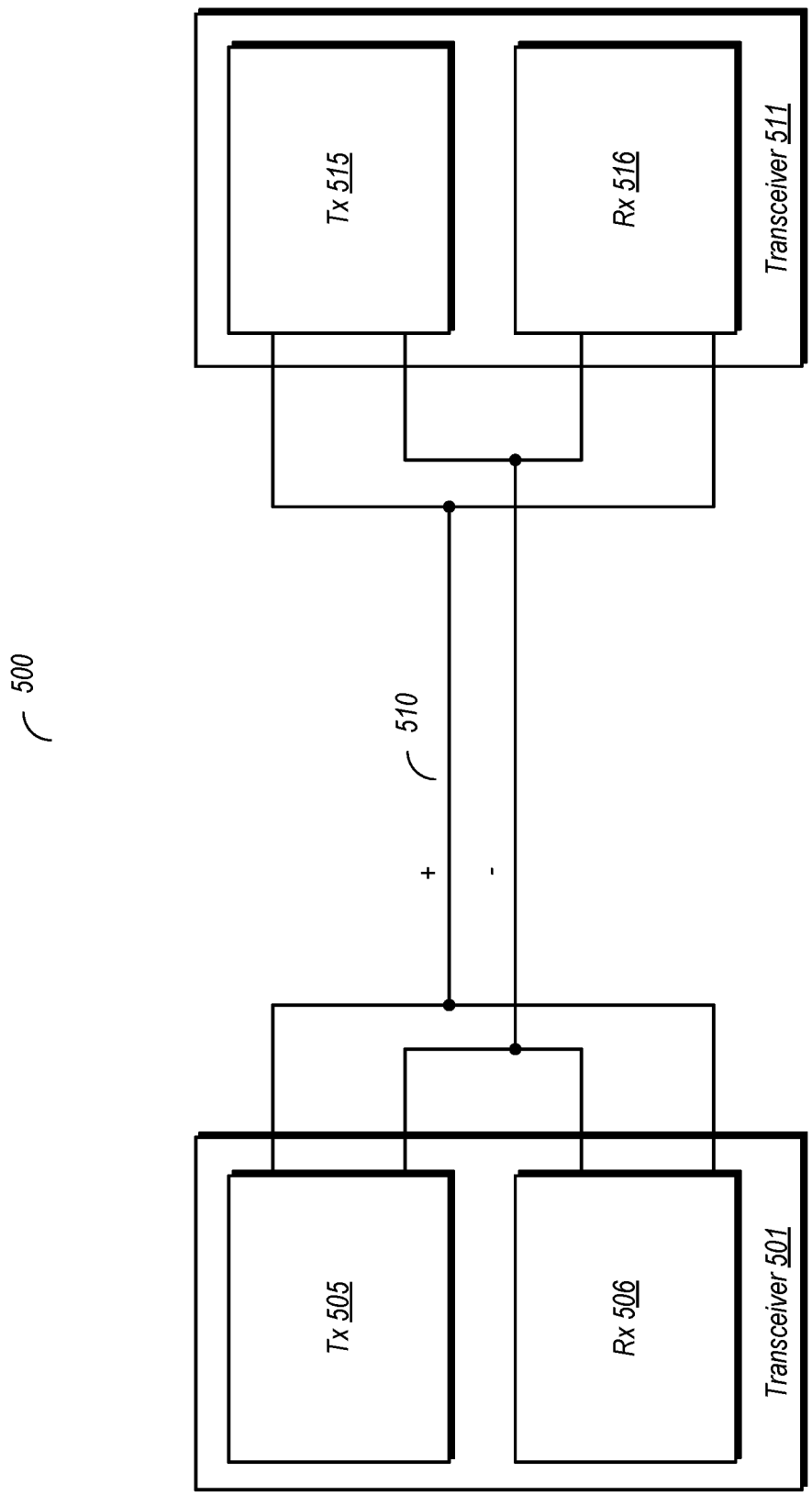
FIG. 5 is a block diagram of one embodiment of a communications system.

Communications System:

FIG. 5 is a simplified block diagram of one embodiment of a serial communications system that may utilize differential signals transferred on a communications channel having true and complement signal lines. In this embodiment, communications system 500 includes transceiver 501 and transceiver 511 coupled to one another by a differential communications channel 510 having true and complement signal lines. Transceiver 501 includes transmitter 505 and receiver 506. Transceiver 511 includes transmitter 515 and receiver 516. In some embodiment, the transmitters and receivers may be largely identical to one another, although embodiments where there are some differences between these units (and the various circuitry implemented therein) are possible and contemplated. At least one of the transmitters 505 or 515 may be arranged in accordance with, e.g., the embodiments of FIG. 1 and/or FIG. 2 of this disclosure, and may thus have the capability to perform charging of the true and complement signal lines to a common mode voltage. The charging may be carried out in accordance with the various methods discussed elsewhere in this disclosure.

It is noted that while the circuits discussed above have been implemented using NMOS and PMOS transistors, the disclosure is not intended to limit embodiments falling within its scope to these types of devices. Thus, in addition to various MOSFET types discussed above, the present disclosure also contemplates embodiments that use non-planar devices such as FinFETs, GAAFETs (Gate All Around FETs), among other types. Embodiments implemented using Bipolar devices are also possible and contemplated. The disclosure further contemplates that technologies that are speculative as of this writing may be used to implement devices in various embodiments of the circuits discussed herein. These technologies include (but are not limited to) graphene transistors, carbon nanotube transistors, gallium arsenide transistors, and so on. The use of memristors in certain circuit structures is also contemplated.

Figure 6:
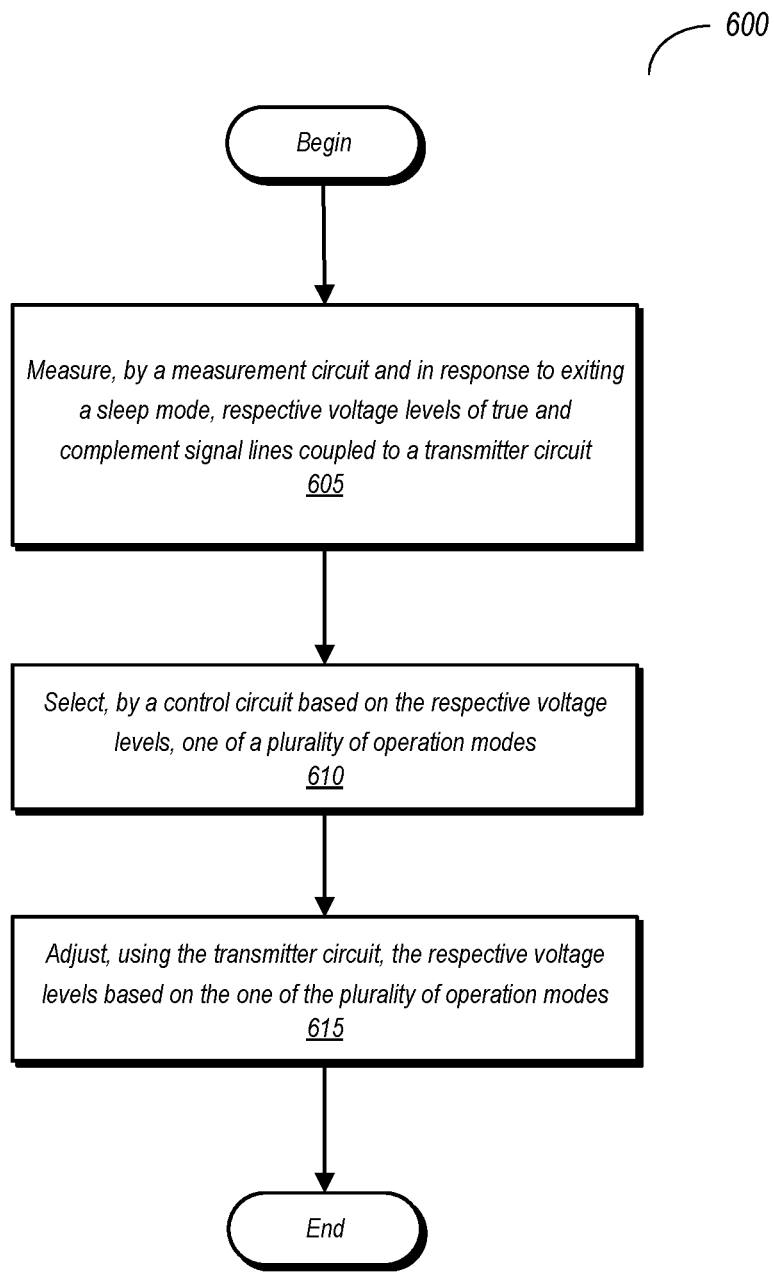
FIG. 6 is a flow diagram illustrating one embodiment of a method for adjusting the voltage on signal lines of a differential signal path.

Methods of Operating:

FIG. 6 is a flow diagram of one embodiment of a method for operating a transmitter circuit that is configured to charge true and complementary signal lines to a common mode voltage (e.g., in response to waking from a sleep state). Method 600 may be carried out by various embodiments of the apparatus discussed above, e.g., those from FIGS. 1 and 2. Embodiments of an apparatus capable of carrying out Method 600, but not otherwise disclosed herein are also considered to fall within the scope of this disclosure.

Method 600 includes measuring, by a measurement circuit and in response to exiting a sleep mode, respective voltage levels of true and complement signal lines coupled to a transmitter circuit (block 605). The method further includes selecting, by a control circuit based on the respective voltage levels, one of a plurality of operation modes (block 610). The method also includes adjusting, using the transmitter circuit, the respective voltage levels based on the one of the plurality of operation modes (block 615).

In various embodiments, the adjusting comprises the transmitter circuit transmitting pulses on the true and complement signal lines to charge the respective voltage levels to a voltage range that includes a common mode voltage. In performing the charging, embodiments of the method include the transmitter circuit transmitting the pulses on the true and complement signal lines at a voltage greater than the common mode voltage. In transmitting the pulses, embodiments of the method include the transmitter circuit varying a width of the pulses transmitted on the true and complement signal lines, and charging the respective voltage levels on the true and complement signal lines in a same direction.

At times, the voltage levels on the true and complement signal lines may be unequal to one another, particularly when coming out of a sleep mode. Accordingly, various embodiments of the method include using a control circuit and during operation in a low power mode, equalizing the respective voltage levels of the true and complement signal lines, wherein the equalizing comprises shorting the true and complement signal lines to one another. Embodiments in which the true and complement signal lines remain shorted together until both are at the common mode voltage are also possible and contemplated.

Figure 7:
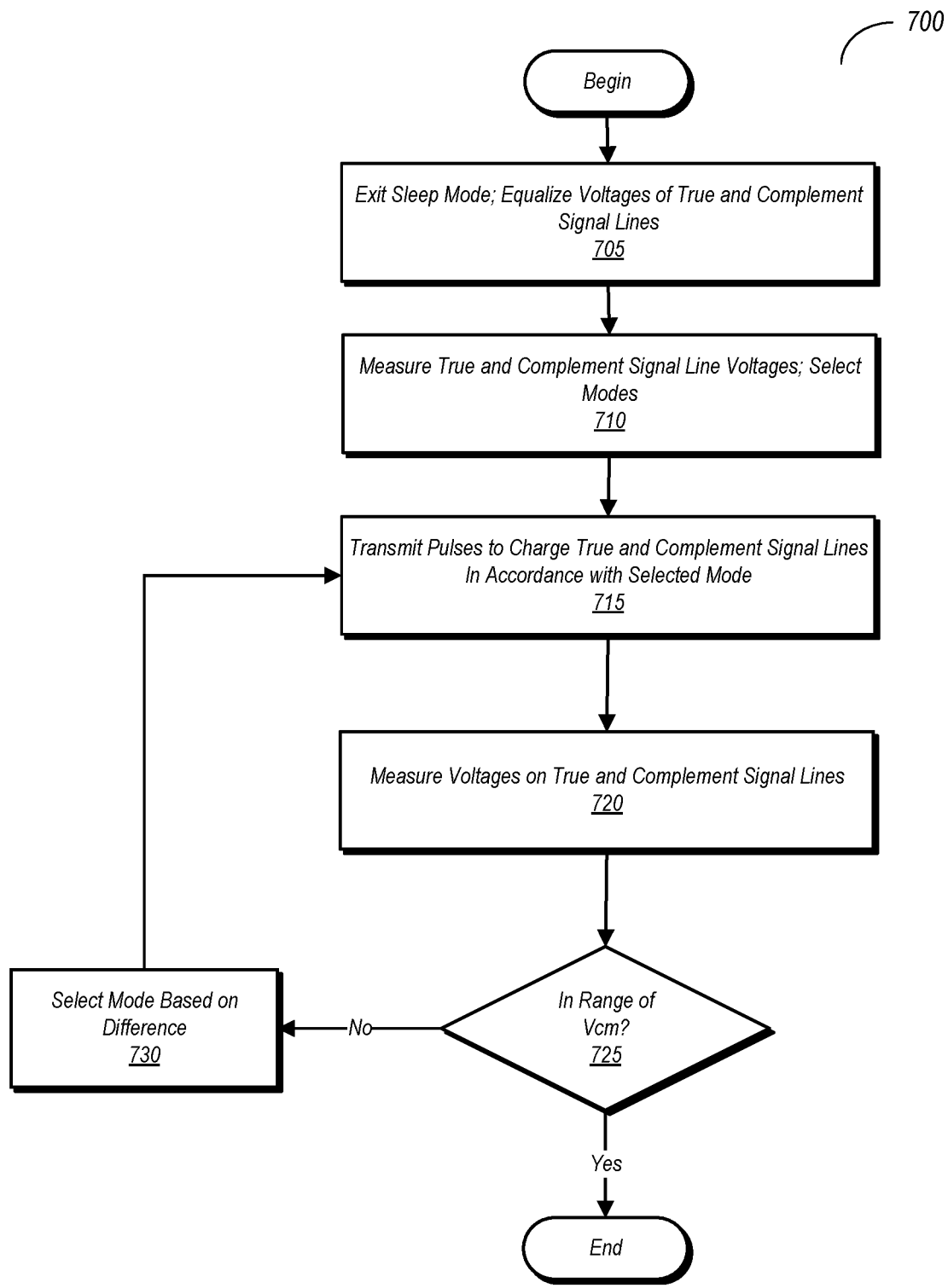
FIG. 7 is a flow diagram illustrating one embodiment of a method for charging true and complementary signal lines of a differential signal path to a common mode voltage.

FIG. 7 is a flow diagram of another embodiment of a method for charging true and complement signal lines of a communications link. Method 700 may be carried out by the various hardware embodiments discussed here, such as those discussed in reference to FIGS. 1 and 2. Embodiments of an apparatus capable of carrying out Method 700, but not otherwise discussed herein, may also be considered to fall within the scope of this disclosure.

Method 700 includes exiting a sleep mode and equalizing the respective voltages present on true and complement signal lines (block 705) of a differential signal path coupled to a transmitter circuit. The voltages may be equalized by closing a switch coupled between the true and complement signal lines, thereby shorting them together. After equalizing the voltages on the true and complement signal lines, a measurement of their respective values may be taken, by a measurement circuit, and based thereon, a control circuit may select an operational mode (block 710). The operational mode may include determining whether the true and complement signal lines are to be charged or discharged to a common mode voltage, width of pulses to be transmitted by the transmitter circuit in performing the charging, and in some embodiments, a voltage of the pulses.

The control circuit may then cause the transmitter circuit to transmit pulses to charge the true and complement signal lines in accordance with the selected mode (block 715). Although the true and complement signal lines normally carry signals that are complements of one another during normal communications operations, during the charging operation, the voltages on these signal lines may be driven at substantially the same levels. That is, the voltages may be adjusted in the same direction concurrently or simultaneously during the operation to charge them to the common mode voltage. In some embodiments, this may be accomplished by keeping the true and complement signal lines shorted together until they are at the common mode voltage.

After transmitting at least one pulse (which may be predetermined in accordance with the operation mode for some embodiments), the transmitter may pause to allow the measurement circuit to measure the respective voltages on the true and complement signal lines (block 720). If the measure voltages are not within the range of the common mode voltage, Vcm (block 725, no), the control circuit may select an operational mode based on the difference (block 730). In some instances, the operational mode may be the same mode as prior to the measurement, while in others, the operational mode may be updated. For example, if the difference between the measurement value and the common mode voltage is significantly smaller than the previous measurement, the operational mode having shorter pulses may be selected. It is also noted that, in embodiments in which the true and complement lines are charged separately, it is possible for there to be a difference between the respective voltages on the true and complement signal lines, and thus an equalization may be carried out in the same manner as prior to beginning the charging process.

After selecting the operational mode in block 730, additional pulses may be transmitted to continue the charging process (block 715), and a subsequent measurement may be performed (block 725). If the respective voltages as measured are in the range of the common mode voltage (e.g., within zone 2 as shown in FIG. 3; block 725, yes), the charging process can be considered complete. However, the loop involving blocks 715, 720, 725, and 730 may be executed as many times as necessary to charge the true and complement signal lines to the common mode voltage.

Although not explicitly discussed with reference to Method 700, it is also possible and contemplated that in some cases, the measure voltages may overshoot the common mode voltage such that they are no longer within the desired range. In such cases, the affected signal lines may be discharged, using discharge circuitry, until they are within the desired range.

Example System

Figure 8:
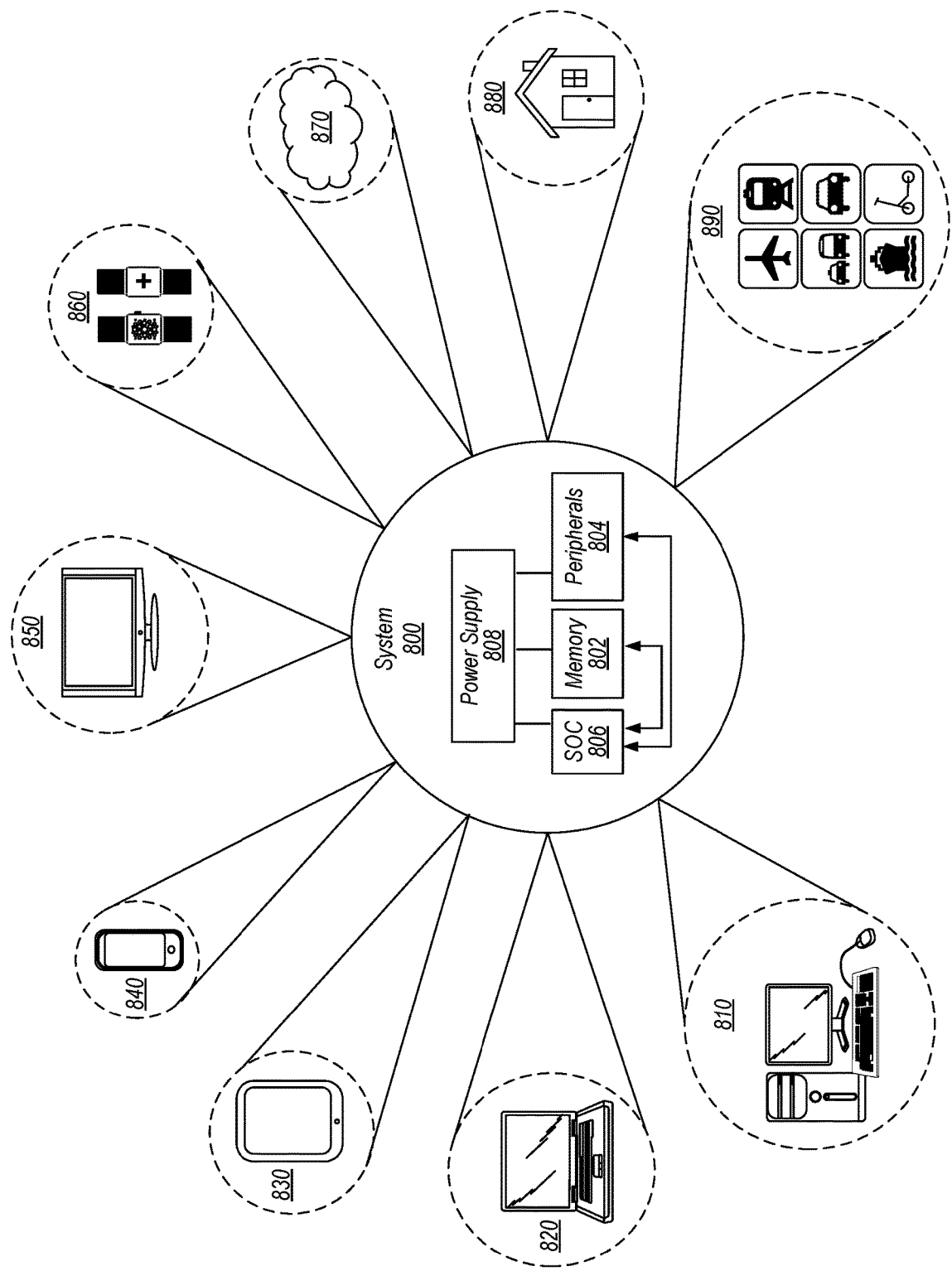
FIG. 8 is a block diagram of an embodiment of an example system.

Turning next to FIG. 8, a block diagram of one embodiment of a system 800 is shown that may incorporate and/or otherwise utilize the methods and mechanisms described herein. In the illustrated embodiment, the system 800 includes at least one instance of a system on chip (SoC) 806 which may include multiple types of processing units, such as a central processing unit (CPU), a graphics processing unit (GPU), or otherwise, a communication fabric, and interfaces to memories and input/output devices. In some embodiments, one or more processors in SoC 806 includes multiple execution lanes and an instruction issue queue. In various embodiments, SoC 806 is coupled to external memory 802, peripherals 804, and power supply 808.

A power supply 808 is also provided which supplies the supply voltages to SoC 806 as well as one or more supply voltages to the memory 802 and/or the peripherals 804. In various embodiments, power supply 808 represents a battery (e.g., a rechargeable battery in a smart phone, laptop or tablet computer, or other device). In some embodiments, more than one instance of SoC 806 is included (and more than one external memory 802 is included as well).

The memory 802 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

The system in the embodiment shown may include various serial communications links similar to those discussed above. These links may be intra-chip links implemented on, e.g., SoC 806, or between different ICs in the system, e.g., between SoC 806 and an integrated circuit associated with one of peripherals 804. The links may include differential signal paths (having both true and complement signal paths) and may further include circuitry such as that discussed above for charging the signal lines to a common mode voltage upon exiting a sleep state.

The peripherals 804 include any desired circuitry, depending on the type of system 800. For example, in one embodiment, peripherals 804 includes devices for various types of wireless communication, such as Wi-Fi, Bluetooth, cellular, global positioning system, etc. In some embodiments, the peripherals 804 also include additional storage, including RAM storage, solid state storage, or disk storage. The peripherals 804 include user interface devices such as a display screen, including touch display screens or multi-touch display screens, keyboard or other input devices, microphones, speakers, etc.

As illustrated, system 800 is shown to have application in a wide range of areas. For example, system 800 may be utilized as part of the chips, circuitry, components, etc., of a desktop computer 810, laptop computer 820, tablet computer 830, cellular or mobile phone 840, or television 850 (or set-top box coupled to a television). Also illustrated is a smartwatch and health monitoring device 860. In some embodiments, smartwatch 860 may include a variety of general-purpose computing related functions. For example, smartwatch 860 may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 800 may further be used as part of a cloud-based service(s) 870. For example, the previously mentioned devices, and/or other devices, may access computing resources in the cloud (i.e., remotely located hardware and/or software resources). Still further, system 800 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 8 is the application of system 800 to various modes of transportation. For example, system 800 may be used in the control and/or entertainment systems of aircraft, trains, buses, cars for hire, private automobiles, waterborne vessels from private boats to cruise liners, scooters (for rent or owned), and so on. In various cases, system 800 may be used to provide automated guidance (e.g., self-driving vehicles), general systems control, and otherwise. These any many other embodiments are possible and are contemplated. It is noted that the devices and applications illustrated in FIG. 8 are illustrative only and are not intended to be limiting. Other devices are possible and are contemplated.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112 (f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. An apparatus, comprising:
a transmitter circuit configured to transmit a differential signal on a communication bus that includes a true signal line and a complement signal line;
a measurement circuit configured to measure respective voltage levels of the true signal line and the complement signal line; and
a control circuit configured to, in response to exiting a sleep mode, select one of a plurality of operation modes using the respective voltage levels of the true signal line and the complement signal line, wherein the operation modes specify characteristics of one or more pulses for charging the true signal line and complement signal line prior to transmitting the differential signal; and
wherein the transmitter circuit is further configured to adjust the respective voltage levels of the true signal line and the complement signal line based on a selected operation mode of the plurality of operation modes.

2. The apparatus of claim 1, wherein the control circuit includes a state machine configured to cause the transmitter circuit to transmit the one or more pulses, and the true and complement signal lines are charged to within one of a plurality of voltage ranges including a common mode voltage for the differential signal.

3. The apparatus of claim 2, wherein the transmitter circuit is configured to transmit at least one of the one or more pulses at a voltage magnitude greater than the common mode voltage.

4. The apparatus of claim 2, wherein the state machine is further configured to, subsequent to causing transmission of the one or more pulses, cause performing of a measurement of the respective voltage levels and further configured to determine whether to cause the transmitter circuit to transmit one or more additional pulses based on the measurement.

5. The apparatus of claim 2, wherein the state machine is further configured to cause the transmitter circuit to vary a duration of the one or more pulses depending on the respective voltage levels.

6. The apparatus of claim 2, wherein the state machine is further configured to cause discharging of the true and complement signal lines in response to at least one of the respective voltage levels being in one of the plurality of voltage ranges that exceeds the one of a plurality of voltage ranges including the common mode voltage.

7. The apparatus of claim 2, wherein the control circuit is configured to, during adjusting of the respective voltage levels of the true signal line and the complement signal line, cause the transmitter circuit to transmit the one or more pulses at an output impedance that is lower than during a normal mode of operation.

8. The apparatus of claim 1, wherein the control circuit is configured to electrically couple the true signal line to the complement signal line to equalize respective voltages present on the true and complement signal lines.

9. The apparatus of claim 1, wherein the control circuit is configured to cause the transmitter circuit to adjust the respective voltage levels of the true signal line and the complement signal line in a common direction with one another.

10. The apparatus of claim 1, wherein the control circuit is configured to cause the transmitter circuit to enter a high impedance state during measurements performed by the measurement circuit.

11. A method comprising:
measuring, by a measurement circuit and in response to exiting a sleep mode, respective voltage levels of true and complement signal lines coupled to a transmitter circuit;
selecting, by a control circuit based on the respective voltage levels, one of a plurality of operation modes; and
adjusting, using the transmitter circuit, the respective voltage levels based on the one of the plurality of operation modes, wherein the adjusting comprises transmitting one or more pulses on the true and complement signal lines to charge the respective voltage levels prior to transmitting a differential signal.

12. The method of claim 11, wherein the adjusting comprises charging the respective voltage levels to a voltage range that includes a common mode voltage for the differential signal.

13. The method of claim 12, further comprising the transmitter circuit transmitting the pulses on the true and complement signal lines at a voltage greater than the common mode voltage.

14. The method of claim 12, further comprising the transmitter circuit varying a width of the pulses transmitted on the true and complement signal lines.

15. The method of claim 12, wherein the adjusting further comprises the transmitter circuit charging the respective voltage levels on the true and complement signal lines in a same direction.

16. The method of claim 11 further comprising, using a control circuit and during operation in a low power mode, equalizing the respective voltage levels of the true and complement signal lines, wherein the equalizing comprises shorting the true and complement signal lines to one another.

17. A system comprising:
a transmitter circuit configured to transmit true and complementary components of a differential signal onto respective true and complementary signal paths;
a measurement circuit configured to measure respective voltages on the true and complementary signal paths; and
a control circuit configured to cause, upon the transmitter circuit exiting a sleep state, to cause the measurement circuit to measure respective voltages on the true and complementary signal paths, and further configured to cause the transmitter circuit to transmit one or more pulses to charge the true and complementary paths to a common mode voltage.

18. The system of claim 17, wherein, in charging the true and complementary signal paths to the common mode voltage, the transmitter circuit is configured to transmit pulses having a voltage that is greater than the common mode voltage.

19. The system of claim 17, wherein the control circuit is configured to, in charging the true and complementary signal paths to the common mode voltage, cause the transmitter circuit to change respective voltage levels of the true and complementary signal paths in same direction.

20. The system of claim 17, wherein the control circuit includes a state machine configured to operate in one of a plurality of different states depending upon the respective voltages present on the true and complementary signal paths, wherein operating in one of a plurality of different states comprises the state machine selecting a duration and a voltage level of the pulses transmitted on the true and complementary signal paths.

* * * * *